United States Patent
Schmidt et al.

(10) Patent No.: US 9,738,458 B2
(45) Date of Patent: Aug. 22, 2017

(54) SYSTEM AND METHOD OF MOVING A WIND TURBINE ROTOR BLADE

(71) Applicant: SIEMENS AKTIENGESELLSCHAFT, München (DE)

(72) Inventors: Thomas Posborg Schmidt, Dronninglund (DK); Soeren Baek Vennegaard, Aalborg (DK)

(73) Assignee: SIEMENS AKTIENGESELLSCHAFT (DE)

( * ) Notice: Subject to any disclaimer, the term of this patent is extended or adjusted under 35 U.S.C. 154(b) by 294 days.

(21) Appl. No.: 14/264,077

(22) Filed: Apr. 29, 2014

(65) Prior Publication Data

US 2014/0356113 A1   Dec. 4, 2014

(30) Foreign Application Priority Data

May 31, 2013   (EP) .................................... 13169955

(51) Int. Cl.
*B65G 47/82* (2006.01)
*F03D 13/40* (2016.01)

(52) U.S. Cl.
CPC ............. *B65G 47/82* (2013.01); *F03D 13/40* (2016.05); *F05B 2260/30* (2013.01); *Y02E 10/72* (2013.01)

(58) Field of Classification Search
CPC .... F05B 2260/30; F03D 1/0633; F03D 1/005; B65G 47/82
USPC ........ 414/433, 772, 774; 410/44, 47, 48, 49; 211/1.53, 95, 115, 163
See application file for complete search history.

(56) References Cited

U.S. PATENT DOCUMENTS

| | | | |
|---|---|---|---|
| 8,322,954 B2* | 12/2012 | ten Thoren | B60P 3/40 410/44 |
| 9,011,054 B2* | 4/2015 | Thomsen | B60P 3/40 410/120 |
| 2005/0031431 A1* | 2/2005 | Wobben | B60P 3/40 410/45 |

(Continued)

FOREIGN PATENT DOCUMENTS

| | | | | |
|---|---|---|---|---|
| DK | WO 2013092597 A1 * | 6/2013 | ............ | F03D 1/003 |
| EP | 2584191 A1 * | 4/2013 | ............ | B23Q 1/763 |

(Continued)

OTHER PUBLICATIONS

European Search Report dated Nov. 8, 2013; Application No. 13169955.5; Siemens Aktiengesellschaft; 6 pgs.

*Primary Examiner* — Michael McCullough
*Assistant Examiner* — Lynn Schwenning
(74) *Attorney, Agent, or Firm* — Schmeiser Olsen & Watts LLP (57) ABSTRACT

A wind turbine rotor blade handling system for moving a wind turbine rotor blade is provided. The wind turbine rotor blade comprises a root portion, a tip portion and a rotor blade longitudinal rotational axis extending from the root portion to the tip portion. Furthermore, the wind turbine rotor blade handling system comprises a rotary device to rotate the wind turbine rotor blade about the rotor blade longitudinal rotational axis. The rotary device is arranged and prepared for being fastened to the tip portion. Additionally, a method of moving the wind turbine rotor blade by means of the wind turbine rotor blade handling system is also provided.

11 Claims, 5 Drawing Sheets

(56) References Cited

U.S. PATENT DOCUMENTS

| | | | |
|---|---|---|---|
| 2006/0251517 A1* | 11/2006 | Grabau | B60P 3/40 416/202 |
| 2007/0253829 A1* | 11/2007 | Wessel | F03D 1/005 416/244 R |
| 2009/0169323 A1* | 7/2009 | Livingston | F03D 1/005 410/120 |
| 2011/0031292 A1 | 2/2011 | Madsen | |
| 2012/0114443 A1* | 5/2012 | Cyrus | B60P 3/40 410/44 |

FOREIGN PATENT DOCUMENTS

| | | |
|---|---|---|
| JP | 2010216317 A | 9/2010 |
| WO | 2012048719 A1 | 4/2012 |

\* cited by examiner

SYSTEM AND METHOD OF MOVING A WIND TURBINE ROTOR BLADE

CROSS-REFERENCE TO RELATED APPLICATIONS

This application claims priority to EP 13169955.5, having a filing date of May 31, 2013, the entire contents of which are hereby incorporated by reference.

FIELD OF TECHNOLOGY

The following relates to a wind turbine rotor blade handling system for moving a wind turbine rotor blade, and a method of moving a wind turbine rotor blade by means of such a handling system.

BACKGROUND

Rotor blades need to be handled, i.e. moved or transported, during manufacturing of the rotor blade and afterwards. A current wind turbine rotor blade typically exhibits a size, i.e. a maximum extension, of at least 50 m and can reach a size of up to 100 m. Thus, handling of such a wind turbine rotor blade is challenging.

Current rotor blade handling systems comprise at least two parts, a root part and a tip part. To rotate the wind turbine rotor blade, the wind turbine rotor blade is rotated by the root part. In other words, a root portion of the wind turbine rotor blade is supported by the root part and rotated by an appropriate mechanism. Meanwhile, a tip portion of the wind turbine rotor blade is fixed by the tip part. The tip portion may be fixed in a disk, and the rotation at the root part may be performed by powered rollers.

A disadvantage of current rotor blade handling systems is that the tip portion is rigidly fixed in the tip part and thus deflection of the wind turbine rotor blade during handling, e.g. during rotation, is difficult or impossible. This causes a problem because of high loads and high forces which are exerted on the rotor blade during rotation. As a consequence, handling of a wind turbine rotor blade is complicated and damages to the wind turbine rotor blade occur frequently.

SUMMARY

Thus, there exists a need to provide an improved system for handling a wind turbine rotor blade with fewer damages to the wind turbine rotor blade caused by the handling compared to the state of the art.

An aspect relates to a wind turbine rotor blade handling system for moving a wind turbine rotor blade. The wind turbine rotor blade comprises a root portion, a tip portion and a rotor blade longitudinal rotational axis extending from the root portion to the tip portion. Furthermore, the wind turbine rotor blade handling system comprises a rotary device which is suited to rotate the wind turbine rotor blade about the rotor blade longitudinal rotational axis. The rotary device is arranged and prepared for being fastened to the tip portion.

A wind turbine rotor blade is arranged and prepared for being a part of a wind turbine. A wind turbine is a device that can convert wind energy, i.e. kinetic energy from wind, into mechanical energy. Advantageously, the mechanical energy is subsequently used to generate electricity. A wind turbine is also referred to as a wind power plant or a wind charger. Furthermore, a wind turbine may also be referred to as a wind turbine engine.

In this application, the wind turbine rotor blade is also simply denoted as a rotor blade. The rotor blade comprises a root, a main body and a tip. At the root, the rotor blade is attached to a hub of a wind turbine. The tip may be characterized as a part of the rotor blade which is most distal from the root. The rotor blade may thus be divided in the root portion, the tip portion and a main body portion. The root portion may be characterized as a portion of the rotor blade which includes the root and the portion around the root. The root portion may comprise up to 20%, in particular up to 10%, of the whole rotor blade. Analogously, the tip portion may be characterized as a portion of the rotor blade which includes the tip and the portion around the tip. The tip portion may be characterized as the portion of the rotor blade where a tip stand is attached to the main body portion. Regarding the maximum extension of the rotor blade, i.e. its maximum length, the tip portion may comprise up to 50% of the total length of the rotor blade. Furthermore, the rotor blade may comprise a trailing edge and a leading edge.

The rotor blade may comprise an axis of symmetry and the rotor blade may be symmetrical regarding rotation of the rotor blade about the axis of symmetry. However, due to an optimal profile of the rotor blade, the rotor blade is not fully symmetrical.

A length of the rotor blade longitudinal rotational axis, which extends from the root portion to the tip portion, may be referred to as a maximum extension of the rotor blade. If the rotor blade comprises an axis of symmetry, the rotor blade longitudinal rotational axis may be equal to the axis of symmetry.

The rotary device may be fastened directly or indirectly to the tip portion. The rotary device is, for example, a part of another device, which is fixed to the tip portion. This other device may be referred to as a tip part of the wind turbine rotor blade handling system. The rotary device may be attached to a chain, which runs around a disk, which secures the tip portion. Thus, by means of the chain, the rotary device may be able to rotate the rotor blade.

By stating that the rotary device is fastened to the tip portion, in the context of this application, it is meant that the rotary device is attached or connected or joined or secured to the tip portion.

Functions of the tip part may be: supporting the rotor blade on the handling system, securing the rotor blade in a fixed position, and rotating the rotor blade.

Embodiments of the wind turbine rotor blade handling system as described above may be flexible and can adapt to various rotor blade positions. This can result in smaller loads on the rotor blade. As a consequence, a risk of damages to the rotor blade is reduced.

Embodiments of a wind turbine rotor blade handling system may be denoted as a rotor blade handling system or as a handling system.

In an exemplary embodiment, the wind turbine rotor blade handling system comprises a pivot mechanism by which the wind turbine rotor blade can be rotated about a rotational axis. The rotational axis is substantially perpendicular to the rotor blade longitudinal rotational axis.

In an exemplary embodiment, if a first axis is referred to as being substantially perpendicular to a second axis, a deviation of up to 20°, in particular of up to 10°, more particularly of up to 5°, is comprised. Analogously, if a first axis is referred to as being substantially parallel to a second axis, a deviation of up to 20°, in particular of up to 10°, more particularly of up to 5°, is comprised as well. Thus, specifically in this embodiment, the rotational axis comprises an angle with the rotor blade longitudinal rotational axis, which is at least 70°, in particular at least 80°, more particularly at least 85°.

The pivot mechanism of the rotor blade handling system can be advantageous when moving or transporting the rotor blade. Due to the pivot mechanism loads and forces, which are exerted on the rotor blade during transportation or moving, may be reduced compared to a fixed attachment of the rotor blade to the rotor blade handling system.

In another exemplary embodiment, the pivot mechanism comprises a first pivot device by which the wind turbine rotor blade can be rotated about a first transversal rotational axis. Additionally, the pivot mechanism comprises a second pivot device by which the wind turbine rotor blade can be rotated about a second transversal rotational axis. Furthermore, the first transversal rotational axis and the second transversal rotational axis are substantially perpendicular to each other. By having two transversal rotational axes being substantially perpendicular to each other and each one being substantially perpendicular to the rotor blade longitudinal rotational axis, any movement in a plane, which is perpendicular to the rotor blade longitudinal rotational axis, is possible. When also counting the movement around the rotor blade longitudinal rotational axis, even any movement in space is possible. In other words, three degrees of freedom are comprised by the handling system.

The first pivot device and/or the second pivot device may comprise a hinge or a joint.

In an exemplary embodiment, the wind turbine rotor blade handling system comprises a tip part frame and a tip part securing means for securing the tip portion to the tip part frame. The tip part securing means may comprise a clamping yaw, a mounting bracket and/or a strap. A requirement for the tip part securing means is, on the one hand, that the rotor blade is secured safely and in a fixed manner. On the other hand, the rotor blade, e.g. a surface of the rotor blade and/or a structural element of the rotor blade, is not damaged by the tip part securing means. The tip part frame may comprise iron. Embodiments of the tip part frame may be mechanically rigid and stable.

In an exemplary embodiment, the wind turbine rotor blade handling system comprises a height adjustment means by which the wind turbine rotor blade can be raised and/or lowered relative to a plane where the wind turbine rotor blade handling system is set up. A handling system which is height adjustable can be advantageous. When a rotor blade is transported, it may first be secured to the tip part frame in a low position. When securing is finished, it is, for instance, raised and subsequently the rotor blade is moved by means of the rotor blade handling system.

The plane where the wind turbine rotor blade handling system is set up is also referred to as a ground, where the handling system is put or is positioned. If the ground is substantially horizontal, the height adjustment means has, for example, a function to vertically adjust the rotor blade.

The height adjustment means may comprise a height adjustment mechanism that works hydraulically. The rotor blade may be raised and/or lowered up to 10 m (metre), in particular up to 2 m.

In an exemplary embodiment, the wind turbine rotor blade handling system comprises a root supporting element which is arranged and prepared for supporting the root portion.

To efficiently move the rotor blade, a second part, which is referred to as a root part, may be used. Due to the length of the rotor blade, which may at least be 50 m in current industrial type applications, and which may reach up to 100 m, the root part may be a separate part relative to the tip part. A function of the root part, in particular the root supporting element, is to support the rotor blade, in particular the root portion, during transportation. The root supporting element may also support the rotor blade during storage.

Embodiments of the root supporting element comprises a root part frame and at least one roller. The root part frame and the roller are joined with each other. The root part frame may hold the roller in an optimal position with respect to the root portion. The roller may be pivoted relative to the root part frame. The roller interacts with the root portion by, for instance, surface friction. The roller may comprise polyurethane. In an exemplary embodiment, the root supporting element comprises four rollers.

In another exemplary embodiment, the roller comprises a roller longitudinal rotational axis. The roller longitudinal rotational axis and the rotor blade longitudinal rotational axis are substantially parallel to each other.

Thus, if the rotor blade is rotated, e.g. by the rotary device located at the tip part, the rotor blade rotates in an opposite direction compared to the roller. In other words, if, for instance, the rotor blade is rotated clockwise, the roller may rotate counter clockwise.

In another exemplary embodiment, the wind turbine rotor blade handling system comprises a roller blocking mechanism for preventing a rotational movement of the roller about the roller longitudinal rotational axis. Thus, the roller can be actively controlled and locked or unlocked. If, for example, the rotor blade is stored or moved in a linear direction, the roller is locked and rotation of the rotor blade is prevented. If, however, it is desired that the rotor blade shall be rotated, then, the roller is actively unlocked.

In an exemplary embodiment, the roller comprises a shape of a circular cylinder. A diameter of the roller may be in a range between 20 cm (centimetre) and 60 cm. In particular, the diameter may be in a range between 40 cm and 50 cm. A length of the roller may be in a range between 20 cm and 100 cm. In one embodiment, it is in a range between 40 cm and 80 cm. The length of the roller may correlate with a length of the rotor blade, i.e. for handling a long rotor blade a longer roller is used than for handling a short rotor blade. However, the length of the roller may correlate with a specific design of the rotor blade and the surface pressure between the rollers and the rotor blade.

In another exemplary embodiment, the root part frame comprises a root part frame cubature that is substantially equal to a root portion curvature of the root portion.

If the root portion comprises a shape of a circular cylinder, an outer radius can be attributed to the root portion. The root supporting element may also comprise a curved shape with an inner radius, which is similar to the outer radius of the root portion. In more general terms, the shape of the root supporting element is adapted to the shape of the root portion.

In another embodiment, the rotary device comprises at least one motor for realizing a rotational movement of the wind turbine rotor blade about the rotor blade longitudinal rotational axis. The motor may be an electrical motor. Embodiments of the electrical motor has a power between 1 kW (kilowatt) and 5 kW, in particular between 2 kW and 2.5 kW on one axis. It can be beneficial to have several motors as the power of a single motor then is smaller compared to one common motor.

The motor may be attached to an outer frame of the tip part, the outer frame being non-rotatable compared to other parts of the tip part which can be rotated or pivoted.

In another embodiment, the rotor blade longitudinal rotational axis is substantially perpendicular to a gravitational force acting on a wind turbine rotor blade during rotation of the wind turbine rotor blade. In other words, if the rotor blade is positioned horizontally, then the rotor blade longitudinal rotational axis is advantageously horizontal as well, a gravitational force acting on the wind turbine rotor blade on its centre of mass.

In another embodiment, the wind turbine rotor blade handling system comprises a means of transportation for moving the wind turbine rotor blade handling system in a plane which is substantially in parallel to the rotor blade longitudinal rotational axis. If a rotor blade is only needed to be rotated about the rotor blade longitudinal rotational axis, then a means of transportation for moving the rotor blade may not be necessary. If, however, the rotor blade shall be transported from one location to another location, then a means of transportation for moving the rotor blade and/or the handling system may be used.

In an advantageous embodiment, the means of transportation comprises an arrangement with a plurality of wheels. The arrangement can be stable enough to support the rotor blade. The wheels may be pivotable, i.e. that they can be swivelled. Furthermore, each one of the root part and the tip part may comprise a plurality, in particular at least three, wheels.

Embodiments of the invention also relate to a method of moving a wind turbine rotor blade by means of a wind turbine rotor blade handling system as described above. In an exemplary embodiment, the method may comprise the following steps:
a) securing the wind turbine rotor blade with the wind turbine rotor blade handling system, and
b) rotating the wind turbine rotor blade, in particular by the rotary device.

Securing the rotor blade may be done manually or automatically. According to common shapes or profiles of the tip portion, there may be predefined programs for securing the tip portion.

In step b) it may be possible to rotate the rotor blade about 360° or less. However, it may also be possible that a maximum rotation of only up to 200° or less is possible.

BRIEF DESCRIPTION

Some of the embodiments will be described in detail, with reference to the following figures, wherein like designations denote like members, wherein.

DETAILED DESCRIPTION

Figure 1:
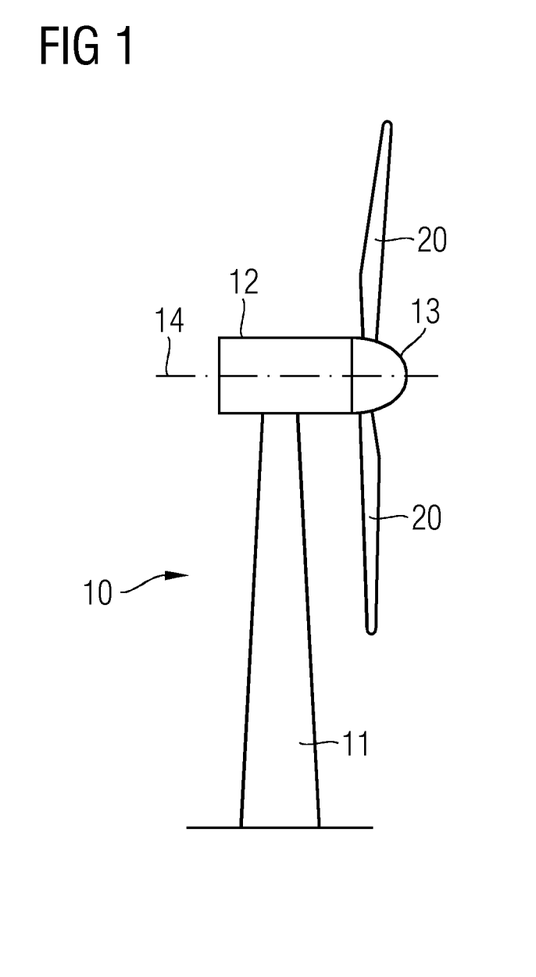
FIG. 1 depicts a schematic view of a wind turbine.

Referring to FIG. 1, a wind turbine 10 with a tower 11 and a nacelle 12 is shown. The nacelle 12 is connected with a hub 13. Two wind turbine rotor blades 20 are mounted to the hub 13. The hub 13, and thus also the wind turbine rotor blade 20, can be rotated about a rotor axis of rotation 14. The wind turbine 10 is a direct drive wind turbine.

Figure 2:
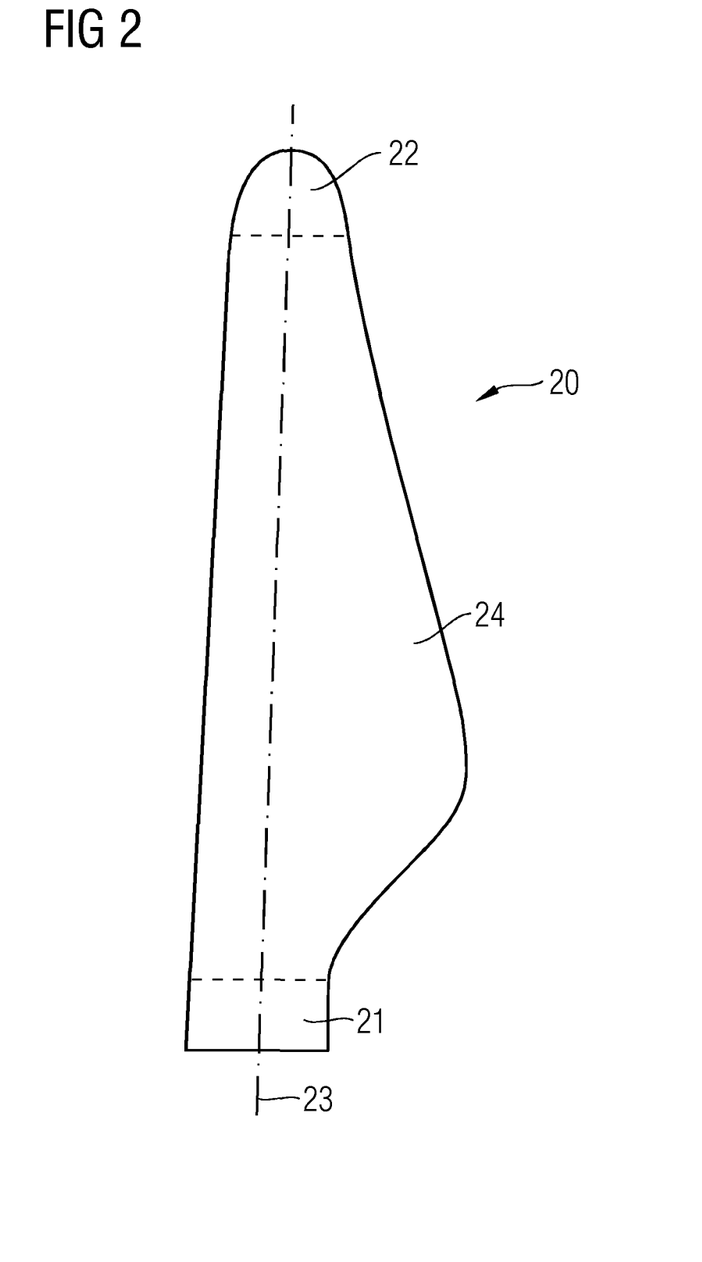
FIG. 2 depicts a schematic view of a wind turbine rotor blade.

Referring to FIG. 2, a wind turbine rotor blade 20 is shown. The wind turbine rotor blade 20 is divided in a root portion 21, a tip portion 22 and a main body portion 24. The root portion 21 comprises a shape of a circular cylinder. The root portion 21 comprises a portion of 5% relative to the maximum length of the whole wind turbine rotor blade 20. The tip portion 22 comprises a portion of 30% relative to the wind turbine rotor blade 20.

Furthermore, the wind turbine rotor blade 20 comprises a virtual axis extending from the root portion 21 to the tip portion 22. This virtual axis is referred to as a rotor blade longitudinal rotational axis 23. The wind turbine rotor blade 20 comprises a maximum extension, extending from the root portion 21 to the tip portion 22, of about 70 m.

Figure 3:
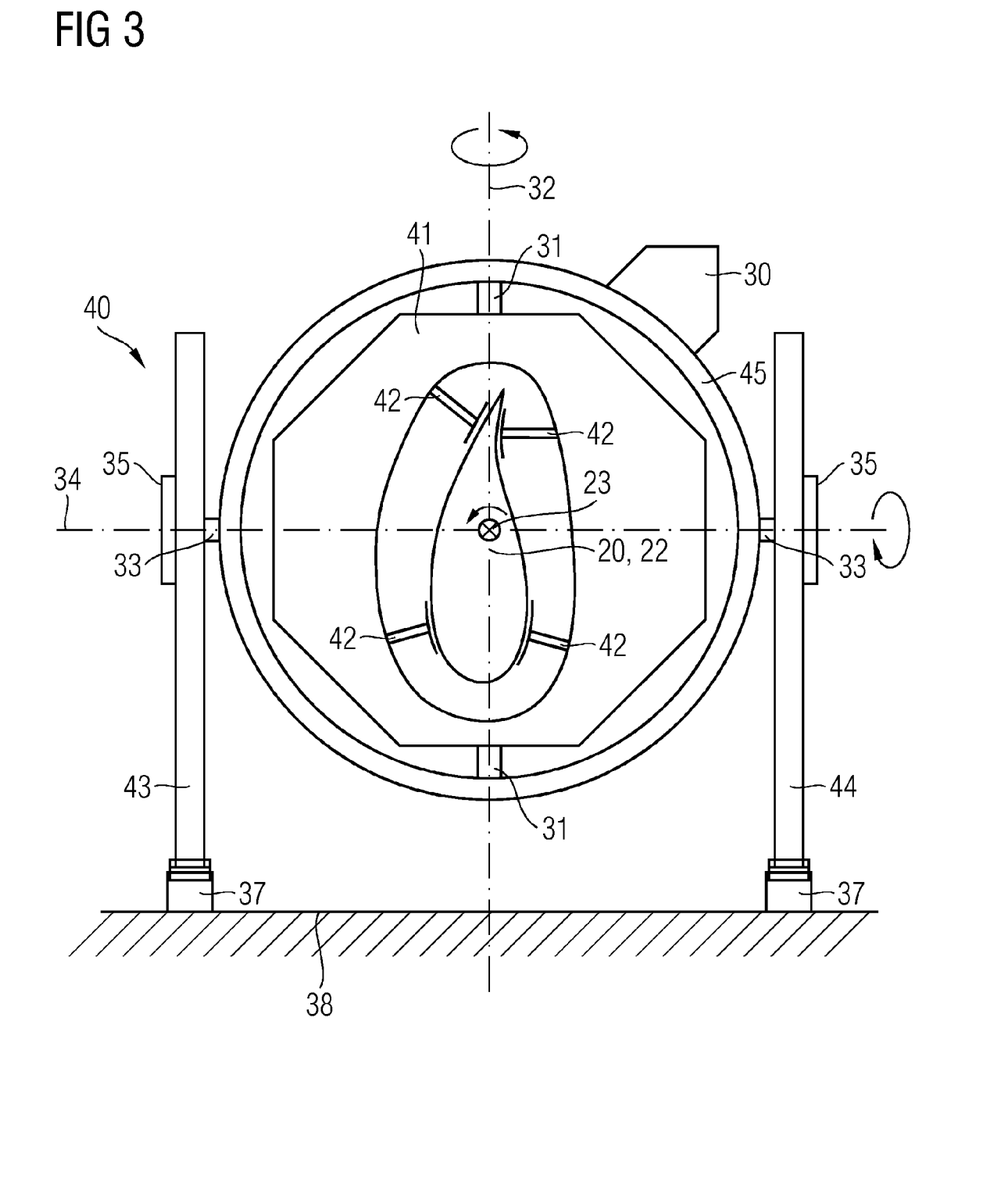
FIG. 3 depicts a schematic view of a tip part of a wind turbine rotor blade handling system.

Referring to FIG. 3, a tip part 40 of a wind turbine rotor blade handling system is shown. The tip part 40 comprises a first rack 43 and a second rack 44. Both racks 43, 44 comprise each a means of transportation 37. The means of transportation 37 comprise two wheels each, which can be swivelled relative to the racks 43, 44. The racks 43, 44 are positioned or set up vertically relative to the ground 38. Alternatively, the racks 43, 44 may also be positioned on a common frame and the means of transportation 37, e.g. comprising three wheels in total, are fixed to the common frame.

Furthermore, the tip part 40 comprises a tip part frame ring 45. The tip part frame ring 45 comprises a shape of a hollow circular cylinder. The tip part frame ring 45 is pivoted relative to the racks 43, 44 by means of a second pivot device 33. The second pivot device 33 is a hinge. The second pivot device 33 allows a rotation of the tip part frame ring 45 about a second transversal rotational axis 34. A rotation about 25° in both directions, thus 50° in total, is possible by the second pivot device 33.

A rotary device 30 is attached to the tip part frame ring 45. By means of a chain, which is running inside the tip part frame ring 45, the rotary device 30 enables a rotation of the tip part frame ring 45 up to 260°. The whole tip part frame ring 45 can be raised and lowered by the height adjustment means 35. Two height adjustment means 35 are included, one at the first rack 43, one at the second rack 44. The height adjustment means 35 raise and lower the tip part frame ring 45 at the second pivot device 33. They enable a vertical shift of up to 2 m.

The tip part 40 further comprises a tip part frame 41, which is made from steel. The tip part frame 41 is pivoted by a first pivot device 31. The first pivot device 31 enables a rotation of the tip part frame 41 about a first transversal rotational axis 32. A rotation of 25° in both directions, thus 50° in total, about the first transversal rotational axis 32 is possible. The first pivot device 31 comprises a hinge.

The tip part frame 41 is connected to a tip part securing means 42. The wind turbine rotor blade handling system shown in FIG. 3 comprises four tip part securing means 42. The tip part securing means 42 comprises a screw by which a wind turbine rotor blade 20 can be secured. The tip part securing means 42 comprises a cushion in order to protect a surface of the wind turbine rotor blade 20 from scratches or other damages.

The wind turbine rotor blade 20 is secured to the wind turbine rotor blade handling system at its tip portion 22. By means of the rotary device 30, the wind turbine rotor blade 20 can be rotated about a rotor blade longitudinal rotational axis 23. It can also be moved in vertical and horizontal direction by the first pivot device 31 and the second pivot device 33.

Figure 4:
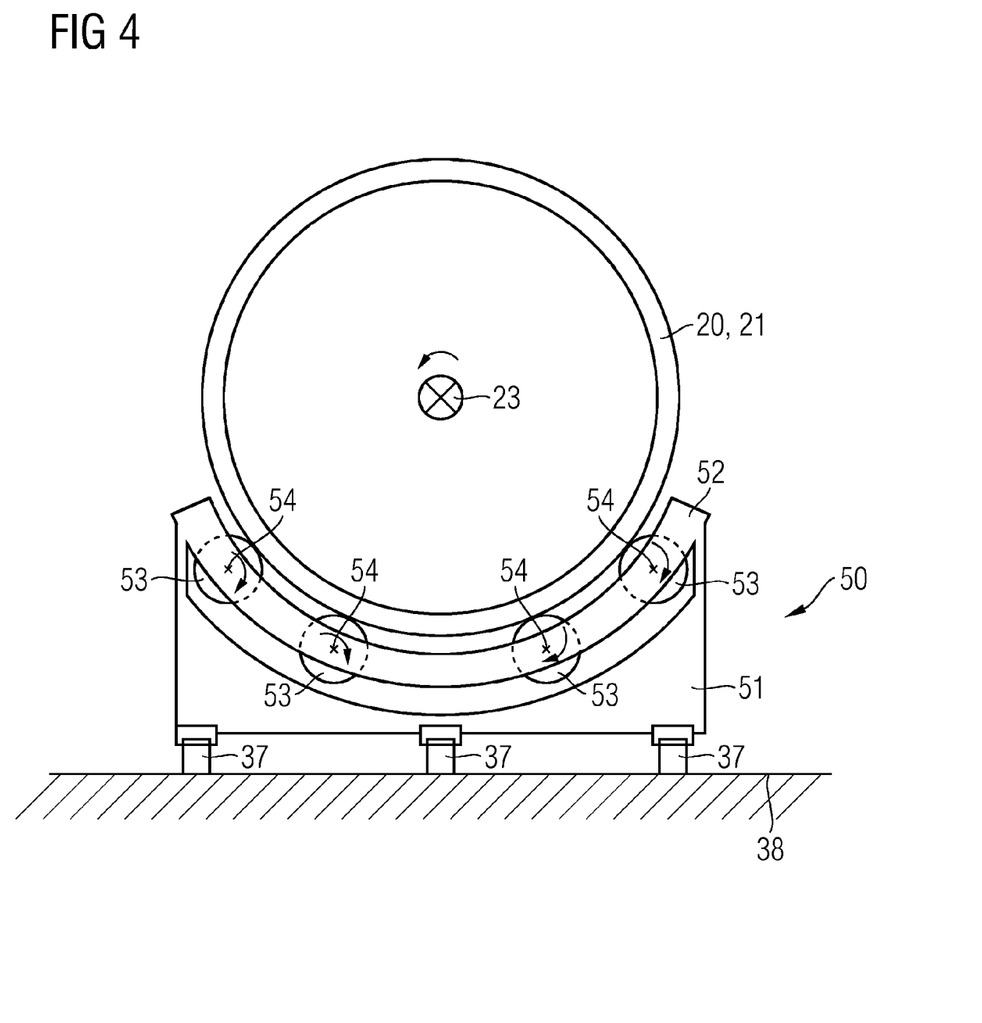
FIG. 4 depicts a schematic view of a root part of a wind turbine rotor blade handling system.

Referring to FIG. 4, a root portion 21 of a wind turbine rotor blade 20 and a root part 50 of a wind turbine rotor blade handling system is shown. The root portion 21 comprises a shape of a circular hollow cylinder that may have a diameter of 2.5 m. The root part 50 comprises a root supporting element 51 which supports the root portion 21. The root supporting element 51 comprises a root part frame 52 which is connected to four rollers 53. The rollers 53 comprise polyurethane and may have a shape of a circular cylinder with a diameter of 430 mm (millimetre) and a length of 400 mm. Each roller 53 is rotatably mounted about a roller longitudinal rotational axis 54. The roller longitudinal rotational axis 54 is substantially parallel to a rotor blade longitudinal rotational axis 23. During operation, i.e. when a rotary device 30 rotates the wind turbine rotor blade 20, the root portion 21 is rotated counter clockwise, while the rollers 53 are rotated clockwise. To clarify, the rollers 53 are either locked to secure the rotor blade 20 or free rolling, so the rotor blade 20 can adapt to the rotation driven by the tip part 40.

Furthermore, the root supporting element 51 comprises three pairs of means of transportation 37 which comprise wheels. The whole root part 50 is located on a ground 38.

Figure 5:
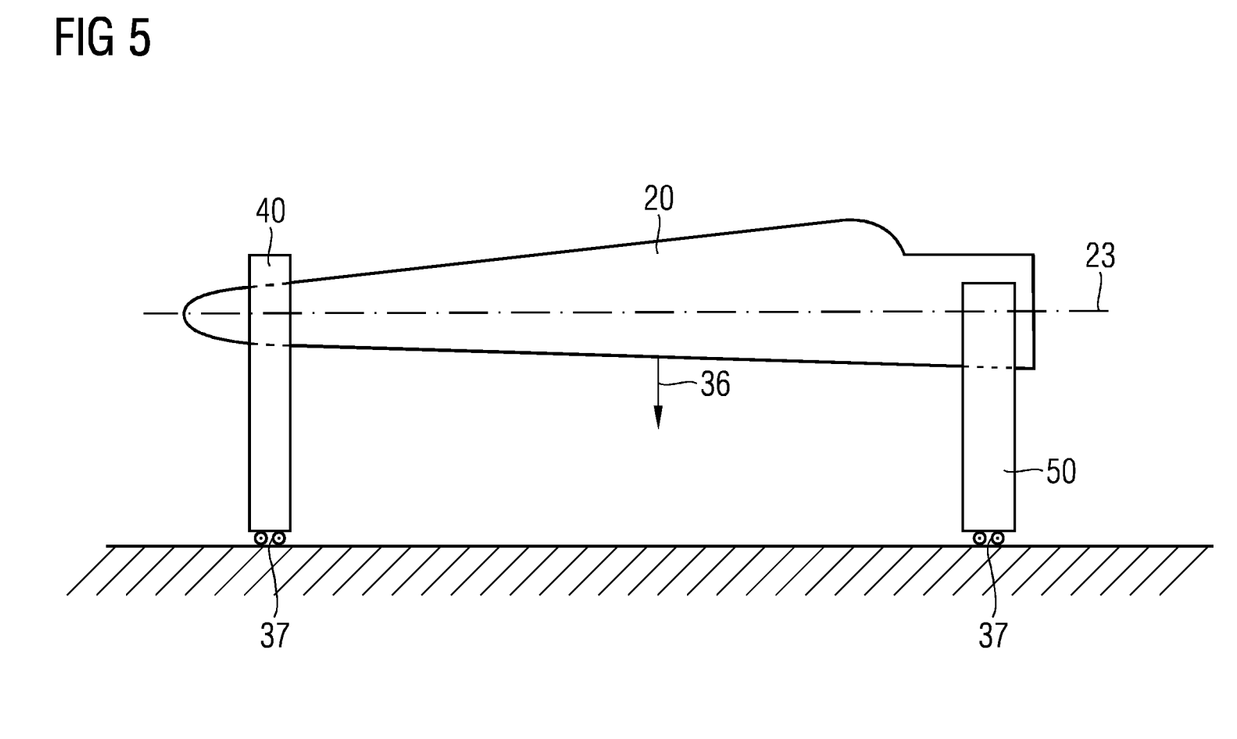
FIG. 5 depicts a schematic view of a wind turbine rotor blade handling system and a wind turbine rotor blade.

Referring to FIG. 5, a wind turbine rotor blade handling system comprising a tip part 40 and a root part 50 is shown. The wind turbine rotor blade handling system can be used for rotating a wind turbine rotor blade 20. The wind turbine rotor blade 20 can, for example, be rotated about a rotor blade longitudinal rotational axis 23 and/or can be moved, i.e. transported in a direction which is substantially perpendicular to a gravitational force 36 of the wind turbine rotor blade 20. The gravitational force 36 refers to a gravitational force 36 which is applied or is exerted on a centre of mass of the wind turbine rotor blade 20. The wind turbine rotor blade handling system also comprises a means of transportation 37 comprising two pairs of wheels. Each wheel can be swivelled.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

The invention claimed:

1. A wind turbine rotor blade handling system for moving a wind turbine rotor blade, wherein the wind turbine rotor blade comprises a root portion, a tip portion and a rotor blade longitudinal rotational axis extending from the root portion to the tip portion, the wind turbine rotor blade handling system comprising:
   a tip part arranged and prepared for supporting the tip portion of the wind turbine rotor blade, the tip part including:
      a tip part frame ring;
      a rotary device attached to the tip part frame ring;
      a first pivot device connecting a tip part frame to the tip part frame ring, the first pivot device allowing a rotation of the tip part frame about a first transversal rotation axis, wherein the first pivot device comprises a hinge;
      a second pivot device connecting the tip part frame ring to a first rack and a second rack, the first rack and the second rack being positioned vertically relative to a ground surface, the second pivot device allowing the tip part frame ring to rotate with respect to the first rack and the second rack about a second transversal rotational axis, wherein the second pivot device comprises a hinge;
      a tip part securing means for securing the tip portion to the tip part frame, disposed within an opening of the tip part frame; and
   a root part, the root part including:
      a root supporting element that is arranged and prepared for supporting the root portion of the wind turbine rotor blade.

2. The wind turbine rotor blade handling system according to claim 1, wherein the wind turbine rotor blade is rotated about the first transversal rotational axis that is substantially perpendicular to the rotor blade longitudinal rotational axis.

3. The wind turbine rotor blade handling system according to claim 1, wherein the wind turbine rotor blade is rotated about the second transversal rotational axis that is substantially perpendicular to both the first transversal rotational axis and the rotor blade longitudinal rotational axis.

4. The wind turbine rotor blade handling system according to claim 1, wherein the root supporting element comprises a root part frame and at least one roller, and the root part frame and the at least one roller are joined with each other.

5. The wind turbine rotor blade handling system according to claim 4, wherein the at least one roller comprises a roller longitudinal rotational axis, and the roller longitudinal rotational axis and the rotor blade longitudinal rotational axis are substantially parallel to each other.

6. The wind turbine rotor blade handling system according to claim 4, wherein the root part frame comprises a root part frame curvature which is substantially equal to a root portion curvature of the root portion.

7. The wind turbine rotor blade handling system according to claim 1, wherein the rotary device comprises at least one motor for realising a rotational movement of the wind turbine rotor blade about the rotor blade longitudinal rotational axis.

8. The wind turbine rotor blade handling system according to claim 1, wherein during rotation of the wind turbine rotor blade, the rotor blade longitudinal rotational axis is substantially perpendicular to a gravitational force acting on the wind turbine rotor blade.

9. The wind turbine rotor blade handling system according to claim 1, wherein the first rack and the second rack each include means of transportation for moving the wind turbine rotor blade handling system in a plane which is substantially in parallel to the rotor blade longitudinal rotational axis.

10. A method of moving a wind turbine rotor blade, comprising:
   providing the wind turbine rotor blade handling system according to claim 1; and
   moving the wind turbine rotor blade using the wind turbine rotor blade handling system.

11. The method according to claim 10, wherein the method comprises the following steps:
   a) securing the wind turbine rotor blade with the wind turbine rotor blade handling system, and
   b) rotating the wind turbine rotor blade by the rotary device.

* * * * *